Patented Dec. 9, 1952

2,621,168

UNITED STATES PATENT OFFICE 2,621,168

CONDENSATION RESINS OF HALOGENATED BENZENE COMPOUNDS

Sidney D. Ross and Moushy Markarian, North Adams, Mass., assignors to Sprague Electric Company, North Adams, Mass., a corporation of Massachusetts No Drawing. Application September 27, 1949, Serial No. 118,203

5 Claims. (Cl. 260—75)

Our present invention relates to new and improved resinous materials. More particularly, it concerns condensation resins possessing unusual temperature and flame resistance. This application is a continuation-in-part of our application Serial No. 6,996, filed February 7, 1948.

In recent years there has been a tremendous development in the production of resinous products by the condensation of components each containing several functional groups that are complementary to (i. e., react readily with) each other. Outstanding in this development has been the production of fibre-forming resins of extremely high molecular weight by the condensation of dibasic acids with diamines. A great many variations have been made in the functional groups employed, as well as in the radicals to which they are attached. In some cases complementary functional groups have been attached to the same radical, thus permitting self-condensation and dispensing with the need for a second component.

It is an object of our invention to provide a new and highly useful group of condensation resins of the above type by employing certain polyfunctional halogenated aromatic compounds as at least one of the components in the condensation reaction. A further object is to prepare condensation resins of this type which are characterized by unusual temperature stability and outstanding dielectric properties. Additional objects will become apparent as the description of our new resins proceeds.

In our above mentioned parent application we have described and claimed a group of aromatic compounds that are particularly useful for the production of new condensation resins. These compounds are characterized by the complete substitution of the aromatic ring with halogen atoms and with functional groups. The functional groups themselves are separated from the aromatic nucleus by an alkylene radical. We pointed out that the resins produced by condensing these compounds with other condensable compounds, were flame and temperature resistant.

This application is particularly directed to the resins described in the parent case and to certain related resins that are formed from compounds whose aromatic nucleus is fully substituted with halogen atoms and with functional groups attached directly to the nucleus. More specifically, we are here concerned with resins formed by condensing compounds conforming to the general formula:

[benzene ring with substituents $[-(CH_2)_m-X]_n$ and $Cl_{6-n}$]

wherein $m$ stands for a number from 0 to 6, $X$ represents a functional group selected from the class consisting of thiol, hydroxy, amino, acid, acid anhydride, acid chloride and iso-cyanate radicals, and $n$ represents an integer from 2 to 3, with compounds containing at least one complementary functional group.

Of such condensation resins we prefer those formed from components which all conform to the above general formula and of such components we prefer those in which $m$ stands for a whole number, i. e., those wherein the functional groups are separated from the aromatic nucleus by an alkylene radical.

Among the suitable compounds conforming to the above general formula there may be mentioned the following:

tetrachloro-1,4-dihydroxymethyl benzene
tetrachloro-1,3-dihydroxymethyl benzene
tetrachloro-1,4-dicarboxymethyl benzene
trichloro-1,3,5-trihydroxymethyl benzene
tetrachloro-1,4-di(beta-hydroxyethyl) benzene
tetrachloro-1,3-dimercaptomethyl benzene
trichloro-1,3,5-tri(beta-carboxyethyl) benzene
tetrachloro-1,4-diaminomethyl benzene
trichloro-1,3,4-trio(gamma - aminopropyl) benzene
tetrachloro-phenylene diisocyanate-1,4
tetrachloro-phenylene diisocyanate-1,3
trichloro-phenylene triisocyanate-1,3,5
tetrachloroterephthalic acid
tetrachloroisophthalic acid
tetrachloro-1,4-diamino benzene
trichloro-1,3,5-tricarboxy benzene
tetrachloro-1,2-dimercapto benzene
tetrachloro terephthalyl chloride Generally speaking, the best results are obtained when employing bifunctional components whose functional groups are substituted in positions para to each other in the benzene ring. When employing trifunctional compounds it is best to have these functional groups symmetrically substituted on the ring. While the outstanding flame resistance and dielectric properties of our new condensation resins are most pronounced when each component thereof corresponds to the general formula, particularly when the $m$ in such general formula stands for a whole number from 1 to 6, excellent results can also be obtained by condensing at least one of such components with one or more different aliphatic, aromatic or other compounds having complementary functional groups.

Among the other types of reactants with which the compounds of the general formula having acid anhydride, carboxyl, isocyanate and/or chloroformate radicals as functional groups may be condensed are the alcohols, mercaptans (thiols) and amines. As examples of such polyfunctional reactants there may be mentioned ethylene glycol, propylene glycol, butylene glycol, diethylene glycol, triethylene glycol, dipropylene glycol, di-methyloldimethylmethane, 2-mercaptoethanol, di-hydroxyethyl sulfide, glycerol, trimethylolethylmethane, d-sorbitol, d-sorbose, mannitol, hydroxyethyl cellulose, propylene di-mercaptan, and hexamethylene diamine.

In case hydroxyl, thiol and/or amino radicals constitute the functional groups in compounds of the general formula, they may be reacted with isocyanates, acids, acid anhydrides and acid chlorides. Among the polyfunctional acids suitable as such reactants are the following: succinic acid, sebacic acid, adipic acid, pimelic acid, suberic acid, azelaic acid, undecanedioic acid, dodecanedioic acid, tetradecanedioic acid, octadecanedioic acid, agathic acid, phthalic acid, and terephthalic acid. The anhydrides, such as maleic anhydride and phthalic anhydride, and the chlorides of the foregoing acids may also be used. Aromatic di-isocyanates are particularly useful as reactants.

When preparing our novel condensation resins we prefer to employ polyfunctional compounds as each of the components. Generally, though not necessarily, all functional groups on each component are the same. According to one embodiment of the invention the compound conforming to the general formula may have two different functional groups that are complementary to each other. An example of such a compound is tetrachloro-1-carboxymethyl-4-aminomethyl benzene. These compounds are capable of self-coupling, i. e. they do not require a second component in the condensation reaction.

As a general rule we prefer to produce our novel resinous condensation products by reacting two or more bifunctional compounds. It is possible in this manner to obtain linear condensation products of very high molecular weight. In many instances, however, trifunctional components are employed in order to produce cross linked chains and resins with increased physical strength and resistance to crushing. In the latter instance the softening points are usually higher.

In accordance with a limited embodiment of the invention, monofunctional components may be reacted with the bifunctional and trifunctional compounds of the general formula to produce condensation products of relatively low molecular weight.

The condensation of the compounds of the general formula with each other and with different compounds containing complementary functional groups may be effected by heating the components, preferably to temperatures in the order of 150° C. to 250° C. The reaction proceeds rapidly during the early stages of heating and gradually slows down thereafter. It may be accelerated by the addition of condensing agents, such as anhydrous zinc chloride, concentrated sulfuric acid, etc. Exceptionally high molecular weights may be achieved by heating the partially condensed reaction mixture at temperatures above 200° C. under greatly reduced pressure. Generally speaking, we employ proportions of the reactants that are calculated to be required for complete reaction between the complementary functional groups. Thus, in case both reactants are bifunctional, we customarily employ equimolecular proportions. However, in some cases it may prove desirable to employ an excess of one of the reactants.

The resinous condensation products obtained according to our invention are useful in varied fields. For electrical purposes their flame resistance, high softening point and excellent dielectric properties make them suitable for the coating of various electrical conductors and the impregnation of porous dielectric separators, such as paper. Partially condensed resins, particularly of such reactants as do not evolve water upon condensation, may be used as potting compounds for casting about electrical assemblies and other devices wherein ultimate physical and chemical protection, as well as electrical insulation, are required. Some of the low molecular weight resins prepared according to our invention are tacky and soft at room temperatures and may be used as plasticizers for a wide variety of natural and synthetic resins. The very high molecular weight resins, particularly those of linear character obtainable by condensation of para-substituted bifunctional components, may be extruded in molten condition through spinning orifices and stretched to form fibers that are highly useful for various textile purposes.

All of the resins produced as described herein possess outstanding resistance to flame and relatively high temperature resistance. One group of preferred resins produced in accordance herewith, namely those in which all reactants conform to the general formula, are substantially non-flammable and will withstand extremely high temperatures without loss of physical, electrical, or chemical properties. It is possible thus to obtain resins which possess an unusual adherence to metal surfaces and at the same time a coefficient of expansion more nearly that of the underlying metal than was heretofore possible.

Certain of the resins described herein can be used as plasticizers for other resins, particularly normally brittle and fragile resins. For example, they may be used to modify phenol-, melamine-, casein-, and urea-formaldehyde condensation resins. Such application results in resin masses with increased adherence to metal surfaces, increased flame resistance and increased shock resistance. In applications of this type the partially or fully cured resins of the invention are added to the thermosetting molding powder.

Thin cast or extruded resins described herein may be used as dielectric films for electrical condensers, transformer spacers and the like. Thin filaments and threads of the resins described herein are useful in the production of flame-resistant fabrics.

The following examples will serve to illustrate the preparation of our new resins. Obviously, our invention is not limited to the details given in these specific examples, since the materials employed and the reaction conditions may be varied widely within the scope of the preceding general discussion.

Example 1

30.2 grams tetrachloroterephthalic acid and 27.4 grams tetrachloro-1,4-dihydroxy methyl benzene were heated in the presence of a trace of anhydrous zinc chloride according to the following schedule:

1 hour at 195° C., 2 hours at 215° C. under water pump vacuum, and finally 2 hours at 250° C. at one to two millimeters pressure. The resulting resin was a brownish, tough material which did not flow at 180° C. and which did not sustain flame.

Example 2

30.2 grams tetrachloro isophthalic acid, 24.0 grams tetrachloro-1,3-dihydroxymethyl benzene and 3.5 grams trichloro-1,3,5-trihydroxymethyl benzene were heated in the presence of a trace of anhyrous zinc chloride according to the following schedule:

2 hours at 200° C., 2 hours at 230° C. under water pump vacuum, and finally 2 hours at 250° C. at one millimeter pressure. The resin obtained was a hard and tough, dark brown material which did not soften at 200° C.

Example 3

29.6 grams tetrachloro-phenylene diisocyanate-1,4 and 27.4 grams tetrachloro-1,4-dihydroxymethyl benzene were heated for 1 hour at 125° C., 3 hours at 235° C. The resulting product was a brown resin which could be dissolved in tetrachloro ethane. Solutions of the resin in this solvent are particularly useful for the production of coatings on metal, the coatings possessing unusually high electrical resistivity and adherence to the underlying metal.

Example 4

10 grams trichloro-phenylene triisocyanate-1,3,5; 20.2 grams tetrachloro-phenylene diisocyanate-1,3; 23.0 grams tetrachloro-1,4-dihydroxymethyl benzene, and 4.5 grams tetrachloro-1,3-dihydroxymethyl benzene were heated for 1½ hours at 180° C., and the reaction product was then dissolved in tetrachloro ethane to form a viscous solution suitable as a wire enameling material. Wires coated with the partially condensed resin were heated for 2 seconds at 275° C. to obtain a tough, crush-resistant resin coating.

Example 5

69 grams of tetrachloro-1,4-dihydroxymethyl benzene and 37 grams of adipic acid were heated in the presence of a trace of anhydrous zinc chloride according to the following schedule:

2 hours at 200–210° C., 1 hour at 220–230° C. under water pump vacuum, and 1 hour at 220–230° C. at one millimeter pressure. The resulting resin was an amber colored material which did not flow at 150° C.

The above procedure was repeated using other bi-functional components in place of the adipic acid. Thus, 41.5 grams of terephthalic acid and 29.6 grams of succinic acid were substituted and a hard, brown resin was obtained in each case. When substituting 32 grams of hexamethylene-di-isocyanate for the acids, a hard, brown resin was also obtained. This latter condensation does not result in the formation and evolution of water, so that the resin may be utilized in its partially condensed state as an impregnant or potting compound for water-sensitive devices, such as electrical transformers.

When one gram of the tetrachloro-1,3-dihydroxymethyl benzene was reacted with 2 cc. of toluene-2,4-di-isocyanate on a hot plate, a dark hard resin was obtained at the end of 3 minutes.

Example 6

11.6 grams hexamethylene diamine and 30.2 grams tetrachloroterephthalic acid were heated in the presence of a trace of anhydrous zinc chloride according to the following schedule:

4 hours at 150° C., and 2 hours at 180° C. under water pump vacuum. The resulting brown resin was dissolved in 500 grams of tetrachloro ethane and applied as a coating solution. Flexible adherent coatings on copper were obtained from this solution.

Example 7

7.6 grams trimethylene glycol and 29.6 grams tetrachlorophenylene diisocyanate-1,4 were heated for 1 hour at 150° C., 2 hours at 200° C., and 3 hours at 250° C. The resulting resin was a brownish, tough material which did not flow at 160° C.

Example 8

69 grams tetrachloro-1,4-dihydroxymethyl benzene, 32 grams of hexamethylene diisocyanate, and 10 grams ground mica were heated for 2 hours at 140° C., and 1 hour at 175° C. The resulting resin was a brownish mass which could be molded at a temperature of about 190° C.

Example 9

30.6 grams tetrachloro-1,4-dimercaptomethyl benzene and 30.2 grams terephthalic acid were heated in the presence of a trace of anhydrous zinc chloride by the following schedule:

1 hour at 160° C. and 5 hours at 220° C. The product was a very tough dark brown material.

Example 10

27.2 grams tetrachloro - 1,4 - di(aminomethyl) benzene, 20.1 grams tetrachlorophthalic acid, and 11.4 grams trichloro-1,3,5-tricarboxy benzene were heated in the presence of a trace of anhydrous zinc chloride by the following schedule:

1 hour at 175° C., 1 hour at 200° C., and 1 hour at 225° C. The resin obtained was very hard and substantially infusible.

Example 11

33.8 grams tetrachloro-terephthalyl chloride and 27.4 grams tetrachloro-1,4-dihydroxymethyl benzene were heated by the following schedule:

1 hour at 140° C., 2 hours at 175° C. under water pump vacuum, and 2 hours at 225° C. at 2 millimeters pressure. An amber resin which did not flow at 170° C. was obtained.

Examples 1, 2, 3, 4, 10 and 11 represent a preferred class of compounds produced in accordance with the invention. The resins so obtained from halogenated components are characterized by an unusual resistance to heat and are nonflammable. The resins produced in Examples 5, 6, 7, 8 and 9 represent another preferred class having unusual toughness and satisfactory resistance to flame.

Fillers, modifiers and other materials can be added to the resins of the invention during or after the condensation thereof to produce modified materials adapted to special applications. The condensation may be carried out in a solvent or in an excess of one of the reactant materials. In accordance with one of the preferred embodiments of the invention, an excess of the functional compound containing acidic or isocyanate groups is provided. Unusual adherence to metal surfaces is obtained when a slight excess of these reactants is present.

The condensation may be partially carried out en masse and subsequently completed during the application of the resin to its ultimate use, for example, as a wire coating as shown in Example 4. In certain instances, for example in the preparation of laminated glass and other massive structures, the reactants can be incorporated in the laminae in an unreacted condition and reacted during the lamination operation. As a general rule, however, it is preferred to at least partially condense the reactants prior to use in this type of process.

As molding compounds, the materials of the invention have wide application. It is often desirable to partially condense bifunctional components and add small amounts of trifunctional components to the molding composiiton. During the heating and pressure encountered in the molding the trifunctional components will cross link the linear chains of the bifunctional components to produce rigid, durable molded bodies. It is apparent that numerous fillers may be added to the resins of the invention to reduce the amount of resin required and to modify the properties thereof.

Methods for producing the compounds of the general formula, that constitute an essential component of our new condensation resins, have been disclosed in our parent application. These involve conventional chemical reactions whereby the desired substituents may be introduced on the benzene ring and whereby one kind of functional group may be converted to another. Thus, in the parent application we have described the preparation of the tetrachloro-1,2-dihydroxymethyl benzene starting with orthoxylene. The hydrogens on the benzene ring are first substituted by chlorine in a chlorination reaction employing sulfuryl chloride. Then one of the hydrogens on each methyl group is substituted by bromine. The dibromide so obtained is acetylated to form the tetrachloro-1,2-di-acetoxymethyl benzene. This is saponified to form the dihydroxymethyl compound.

The dihydroxymethyl compound may be converted to the dichloroformate by treatment with phosgene in an inert solvent. One can obtain the dicarboxymethyl compound from the dibromide mentioned above by reacting the latter with potassium cyanide in aqueous acetone to form the dinitrile, followed by acidic or alkaline hydrolysis. The dithiol may be obtained by heating the dibromide with potassium hydrogen sulfide in acetone and the diamine by treating the dicarboxylic acid with hydrazoic acid. Other methods of synthesizing the compounds of the general formula will be apparent to those skilled in the art.

As many apparently widely different embodiment of this invention may be made without departing from the spirit and scope hereof, it is to be understood that the invention is not limited to the specific embodiments hereof except as defined in the appended claims.

We claim:

1. A resinous mass comprising the condensation product of at least one tetrachloro-phenylene diisocyanate with at least one tetrachloro-di-hydroxymethyl benzene.

2. A resinous mass comprising the condensation product of a tetrachloro phthalic acid, a trichloro-tri-carboxy benzene and a tetrachloro-dihydroxymethyl benzene.

3. A resinous mass comprising the condensation product of tetrachloro tere-phthalic acid and tetrachloro-1,4-di-hydroxymethyl benzene.

4. A resinous mass comprising the condensation product of hexamethylene diisocyanate and tetrachloro-1,4-dihydroxymethyl benzene.

5. Resinous condensation products of at least two substituted benzenes in each of which at least three and not more than four benzene hydrogens are substituted by chlorine, and the remaining hydrogens are all substituted by condensation radicals of the class consisting of thiol, hydroxy, amino, isocyanate, carboxyl, carboxylic chloride, carboxylic anhydride, and alkylene groups containing a member of the above class and not more than six alkylene carbon atoms, the condensation being a linkage by reaction between a radical selected from the thiol, hydroxy and amino groups of one of the substituted benzenes with one of the other radicals of said class on another of the substituted benzenes.

SIDNEY D. ROSS.
MOUSHY MARKARIAN.

REFERENCES CITED

The following references are of record in the file of this patent:

UNITED STATES PATENTS

| Number | Name | Date |
|---|---|---|
| 2,370,394 | Cass | Feb. 27, 1945 |
| 2,443,887 | Bohrer | June 22, 1948 |
| 2,455,873 | Nordlander et al. | Dec. 7, 1948 |

FOREIGN PATENTS

| Number | Country | Date |
|---|---|---|
| 593,414 | Great Britain | Oct. 16, 1947 |